(12) United States Patent
Li et al.

(10) Patent No.: US 9,684,091 B2
(45) Date of Patent: *Jun. 20, 2017

(54) APPARATUS AND METHOD FOR SIMULTANEOUSLY OBTAINING QUANTITATIVE MEASUREMENTS OF FORMATION RESISTIVITY AND PERMITTIVITY IN BOTH WATER AND OIL BASED MUD

(71) Applicant: Weatherford Technology Holdings, LLC, Houston, TX (US)

(72) Inventors: Shanjun Li, Katy, TX (US); Jiefu Chen, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,643

(22) Filed: Apr. 27, 2016

(65) Prior Publication Data

US 2016/0238733 A1   Aug. 18, 2016

Related U.S. Application Data

(63) Continuation of application No. 14/528,568, filed on Oct. 30, 2014, now Pat. No. 9,341,735.

(51) Int. Cl.
*G01V 3/00* (2006.01)
*G01V 3/18* (2006.01)
(Continued)

(52) U.S. Cl.
CPC ............ *G01V 3/28* (2013.01); *E21B 17/1078* (2013.01); *E21B 47/01* (2013.01); *E21B 49/00* (2013.01);
(Continued)

(58) Field of Classification Search
CPC ... G01V 3/28; G01V 3/30; G01V 3/38; G01V 5/04; G01V 5/045; G01V 5/101;
(Continued)

(56) References Cited

U.S. PATENT DOCUMENTS 3,660,755 A     5/1972  Janssen
4,888,740 A  *  12/1989 Brie .................. G01V 1/50
                                                181/102

(Continued)

FOREIGN PATENT DOCUMENTS

EP         2520951 A2     4/2012
WO    2012/030327 A1     3/2012

*Primary Examiner* — Hoai-An D Nguyen
(74) *Attorney, Agent, or Firm* — Blank Rome LLP

(57) ABSTRACT

An apparatus and method for simultaneously obtaining quantitative measurements of vertical and horizontal resistivity and permittivity formation parameters by firing, using at least one transmitter in each of a horizontally and vertically polarized array on opposite sides of a drill collar, signals in the direction of a downhole formation, the fired signals from the transmitters in the arrays being fired simultaneously and engaging the downhole formation. The apparatus and method continues by receiving, using at least one receiver in each of the arrays, signals associated with the fired signals after the fired signals have engaged the downhole formation, where the received signals represent apparent formation data. The apparatus and method further involves determining, using the measured apparent formation data, the true formation data including one or more vertical and horizontal formation parameters.

21 Claims, 7 Drawing Sheets

(51) Int. Cl.
    *G01V 3/28*     (2006.01)
    *G01V 1/30*     (2006.01)
    *G01V 1/50*     (2006.01)
    *G01V 3/30*     (2006.01)
    *G01V 3/38*     (2006.01)
    *E21B 17/10*     (2006.01)
    *E21B 47/01*     (2012.01)
    *E21B 49/00*     (2006.01)
    *G01V 3/10*     (2006.01)
    *G01V 99/00*     (2009.01)
    *G01V 5/04*     (2006.01)
    *G01V 11/00*     (2006.01)

(52) U.S. Cl.
    CPC .................. G01V 1/30 (2013.01); G01V 1/50 (2013.01); G01V 3/104 (2013.01); G01V 3/30 (2013.01); G01V 3/38 (2013.01); G01V 99/005 (2013.01); G01V 5/045 (2013.01); G01V 11/002 (2013.01)

(58) Field of Classification Search
    CPC ...... G01V 5/104; G01V 11/00; G01V 11/002; G01V 11/005; G01V 99/005; E21B 47/00; E21B 47/0007; E21B 47/01; E21B 47/011; E21B 47/026; E21B 44/00; E21B 17/1078; E21B 49/00
    USPC ........ 324/339, 338, 334, 332, 323; 702/6, 7, 702/8, 9, 10, 11; 250/265, 266, 268, 250/269.1, 269.2, 269.3, 269.4, 269.5, 250/269.6, 269.7, 269.8
    See application file for complete search history.

(56) References Cited

U.S. PATENT DOCUMENTS

| | | | | |
|---|---|---|---|---|
| 5,345,179 | A * | 9/1994 | Habashy | G01V 3/30 |
| | | | | 324/338 |
| 9,341,735 | B1 * | 5/2016 | Li | G01V 1/30 |
| 2007/0257677 | A1 | 11/2007 | Wang | |
| 2010/0321022 | A1 * | 12/2010 | Seydoux | G01V 3/28 |
| | | | | 324/338 |

\* cited by examiner

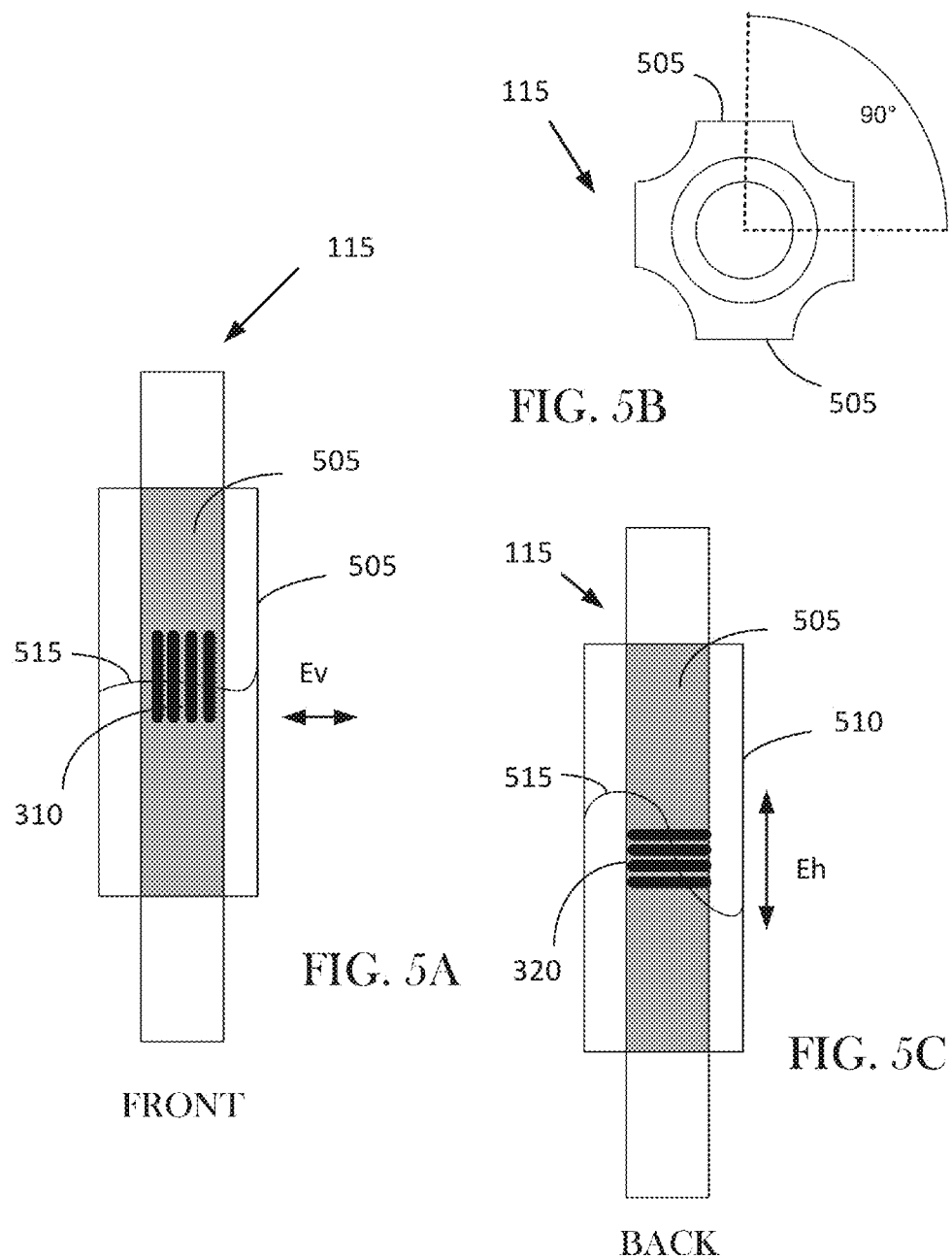

APPARATUS AND METHOD FOR SIMULTANEOUSLY OBTAINING QUANTITATIVE MEASUREMENTS OF FORMATION RESISTIVITY AND PERMITTIVITY IN BOTH WATER AND OIL BASED MUD

BACKGROUND OF THE DISCLOSURE

During the exploration of oil and gas, measuring the resistivity and permittivity of a formation downhole can provide important data for geologist and petro physicist to evaluate formation property, such as whether a formation contains water or hydrocarbons. Due to deposition, fractures, and the lamination of layers within a formation, etc., formations downhole will typically exhibit some form of anisotropy. The resistivity and permittivity anisotropy of a formation downhole can represent this formation anisotropy. The anisotropy has large effects on the resistivity and permittivity measurements, which will affect the accuracy of formation evaluation.

Anisotropy is commonly modeled using transverse isotropy (TI). A formation will exhibit TI-anisotropy when it has an axis of symmetry such that along any direction parallel (or transverse) to this axis the material properties of the formation are the same. However, between the axis of symmetry and a direction perpendicular to the axis of symmetry, one will see a material property difference.

Electromagnetic tools used in wireline and measurement while drilling (MWD) applications are typically used for measuring formation resistivity and dielectric permittivity. However, some electromagnetic tools, such as resistivity and permittivity measurement tools, used in wireline haven't used in MWD.

Also, although these electromagnetic tools used in MWD are capable of taking measurements while drilling, these tools are currently focused on measuring TI-anisotropy of a formation in one direction relative to the axis of the tool, and cannot measure the anisotropy of a formation in multiple directions simultaneously.

Further, another limitation of many electromagnetic tools which can operate in water base-mud is that they cannot operate in oil based mud due to the non-conductive nature of some oil based mud. Therefore, having the ability to operate in both oil based mud and water base mud environment is one advantage some electromagnetic tools have over others. By operating electrical electromagnetic tools using higher frequencies (in the range of hundreds of Megahertz to Gigahertz), these tools are better able to take measurements in oil based mud as well as in water base mud.

It is therefore desirable to have an apparatus and method for taking quantitative measurements of formation parameters, such as resistivity and permittivity, in multiple directions simultaneously. Moreover, it is also desirable to be able to take quantitative measurements of the formation parameters in both water based and oil based mud. The subject matter of the present disclosure is directed to overcoming, or at least reducing the effects of, one or more of the problems set forth above.

SUMMARY OF THE DISCLOSURE

The present disclosure involves an apparatus and method for simultaneously obtaining quantitative measurements of vertical and horizontal resistivity and permittivity by firing, using at least one transmitter in each of a horizontally and vertically polarized array on opposite sides of a drill collar, signals in the direction of a downhole formation, the fired signals from the transmitters in the arrays being fired simultaneously and engaging the downhole formation.

The apparatus and method continues by receiving, using at least one receiver in each of the arrays, signals associated with the fired signals after the fired signals have engaged the downhole formation, where the received signals represent apparent formation measurement data.

The apparatus and method further involves determining, using the measured apparent formation data, the true formation data including one or more vertical and horizontal formation parameters.

The foregoing summary is not intended to summarize each potential embodiment or every aspect of the present disclosure.

BRIEF DESCRIPTION OF THE DRAWINGS

FIGS. 5A-5C illustrate side and cross-sectional views of a stabilizer according to the present disclosure.

DETAILED DESCRIPTION OF THE DISCLOSURE

Overview of the Apparatus

Figure 1:
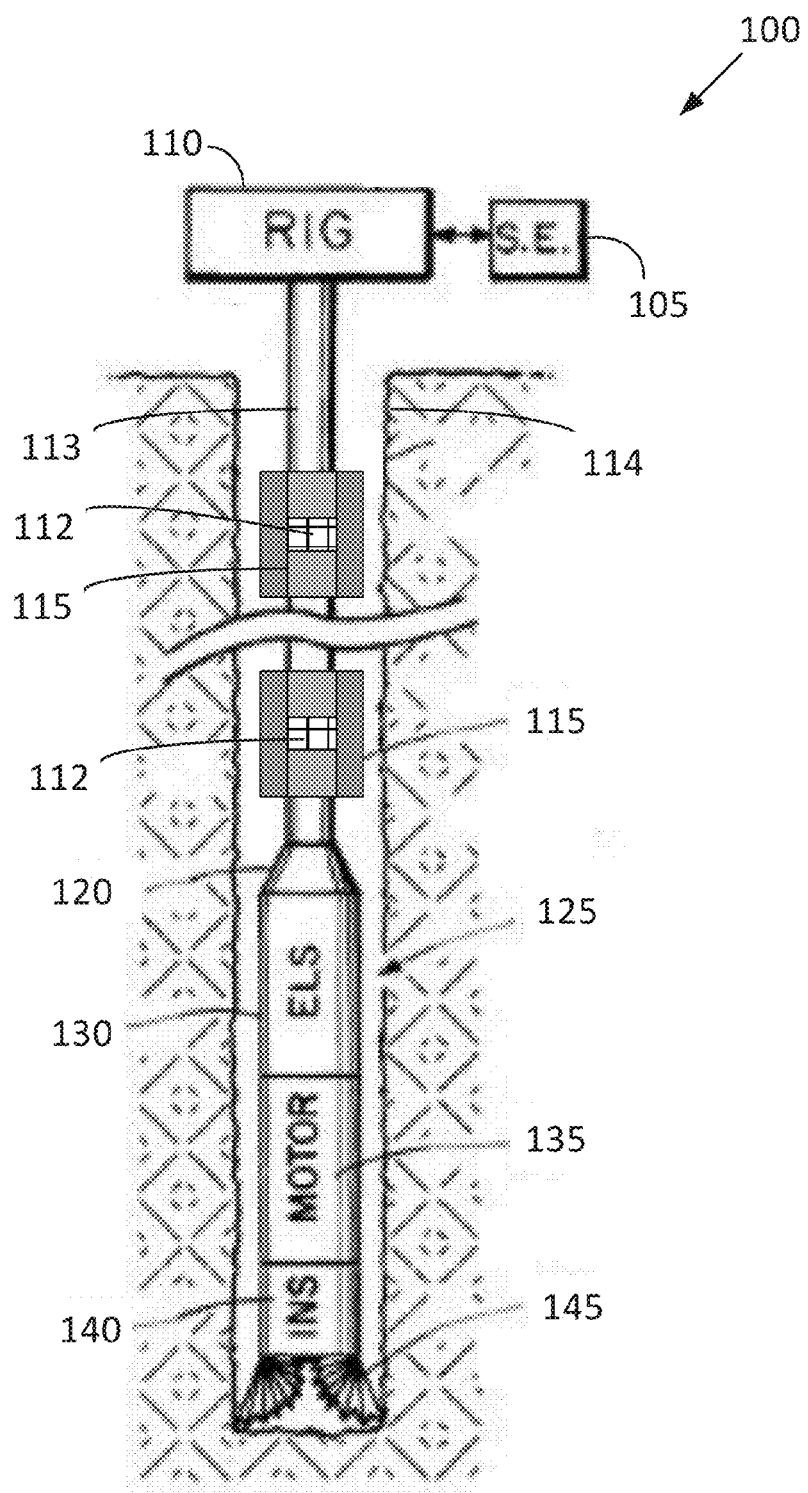
FIG. 1 illustrates a downhole tool disposed in a wellbore according to the present disclosure.

FIG. 1 illustrates a downhole tool 100 having a cylindrical body disposed in a wellbore 114 according to the present disclosure. As shown, the downhole tool 100 includes a drill string 113 being disposed in a wellbore 114 from a drilling rig 110 and has a bottom hole assembly (BHA) including a drill collar 125 disposed thereon. The rig 110 also has draw works and other systems for controlling the drill string 113 as it advances in and out of the wellbore 114. The rig also has mud pumps (not shown) that circulate drilling fluid or drilling mud through the drill string 113.

As shown, the drill collar 125 of the downhole tool (100) has an electronics section 130, a mud motor 135, and an instrument section 140. Drilling fluid flows from the drill string 113 and through the electronics section 130 to the mud motor 135. Powered by the pumped fluid, the motor 135 imparts torque to the drill bit 145 to rotate the drill bit 145 and advance the wellbore 114.

Also as shown, one or more centralizers 115 may be disposed on a drill collar or on the drill string 113, and may act as a stabilizer for stabilizing the drill string 113 in the wellbore 114. Further as will be discussed below, one or more electromagnetic antenna arrays 112 can be disposed on the centralizers 115. However, as not to limit the antenna arrays 112 to being disposed on the centralizers 115, the arrays may be disposed anywhere on the BHA, preferably on the drilling collar within the wellbore 114. Surface equipment 105 having an up hole processing unit (not shown) may also obtain and process formation measurement data from the electromagnetic antenna arrays disposed on the centralizers 115. Typically, the surface equipment 105 may communicate data with the electromagnetic antenna arrays and/or electronics section 130 using telemetry systems known in the art, including mud pulse, acoustic, and electromagnetic systems.

Figures 2A, 2B:
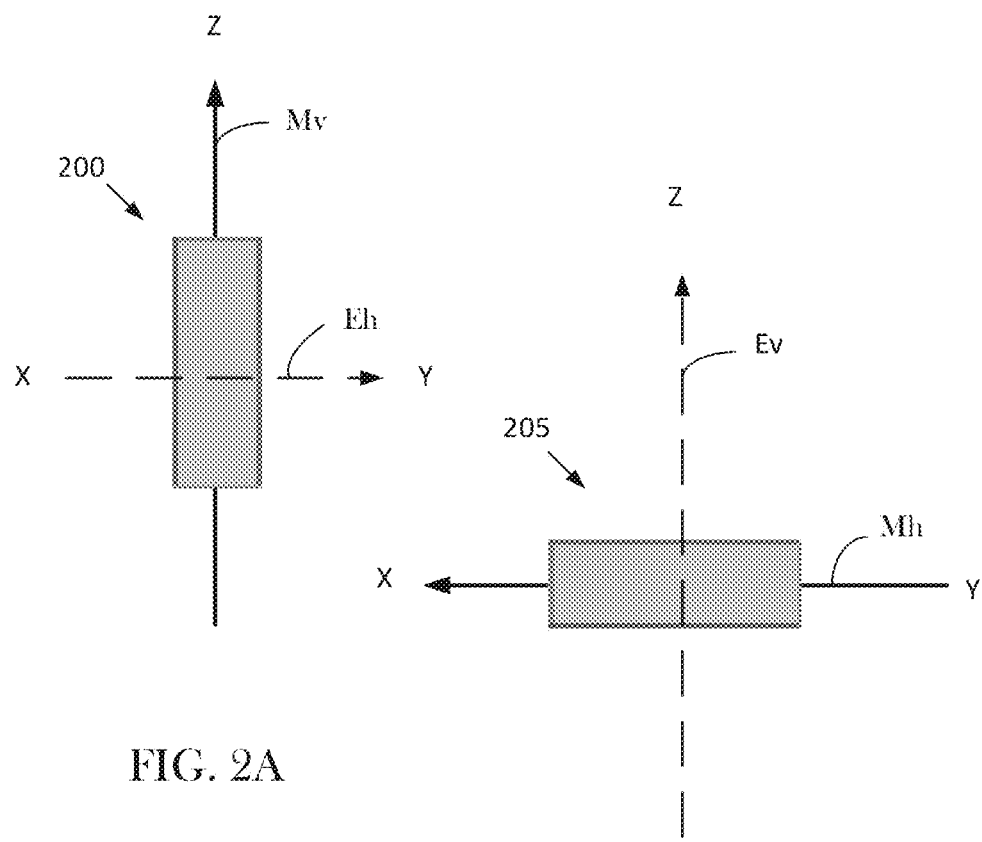
FIGS. 2A-2B illustrate vertical and horizontal antenna elements according to the present disclosure.

Referring now to FIGS. 2A-2B, vertical and horizontal slot antenna elements (200 and 205) are illustrated according to the present disclosure. As discussed below, each slot antenna element (200 and 205) may be used for both transmitting and receiving electrical signals into a wellbore 114. Also, more than one slot antenna (200 and 205) may be included in the electromagnetic antenna arrays 112 discussed above.

As will be appreciated by those skilled in the art, this disclosure is not limited to a particular type of slot antenna (200 and 205) for transmitting and/or receiving electrical signals, as any slot antenna known in the art for transmitting and receiving electrical signals may be used (e.g., horn antennas including a waveguide, etc.).

Also, although the present disclosure is indifferent to the type of slot antenna (200 and 205) that may be used, in order for the tool to operate in oil based mud, the slot antenna (200 and 205) must operate using higher frequencies. For example, in one aspect of the invention, operating slot antennas 200 may use a frequency range between 10 MHz (Megahertz) and 20 GHz (Gigahertz).

In one example, the openings of the slot antenna elements (200 and 205) may be filled with an epoxy or other non-conducting filler. This epoxy serves to protect the slot antenna elements (200 and 205) during logging while drilling operations. Further, the shape of the slot antenna elements (200 and 205) is not limited to having rectangular apertures as shown, as different antenna aperture designs may be incorporated.

Now referring to FIG. 2A, because slot antenna element 200 is shown oriented vertically with respect to the Z axis (i.e., magnetically polarized in a vertical direction) it is considered to be vertically polarized. Thus, the vertically polarized slot antenna elements 200 can be regarded as having vertical magnetic moments. Furthermore, as will be described further below, because electrical current will traverse the vertically polarized slot antenna elements 200 along the X/Y axis, the vertically polarized slot antennas 200 are considered to have horizontal electric moments (Eh). The horizontal or vertical orientations of the antenna elements are with respect to the axes of the drill string 113.

Likewise as shown in FIG. 2B, because the slot antenna element 205 is shown oriented horizontally along the X/Y axis, it is considered to be horizontally polarized. Also, because the magnetic polarization of horizontally polarized slot antenna 205 is along the X/Y axis, horizontally polarized slot antenna elements 205 can be regarded as having a horizontal magnetic moment. Also as will be discussed below, because electrical current will flow through the horizontally polarized slot antennas 205 in a direction orthogonal to the direction of its magnetic polarization (i.e., along the Z axis), the horizontally polarized slot antenna elements 205 are considered to have a vertical electric moment (Ev).

Figure 3:
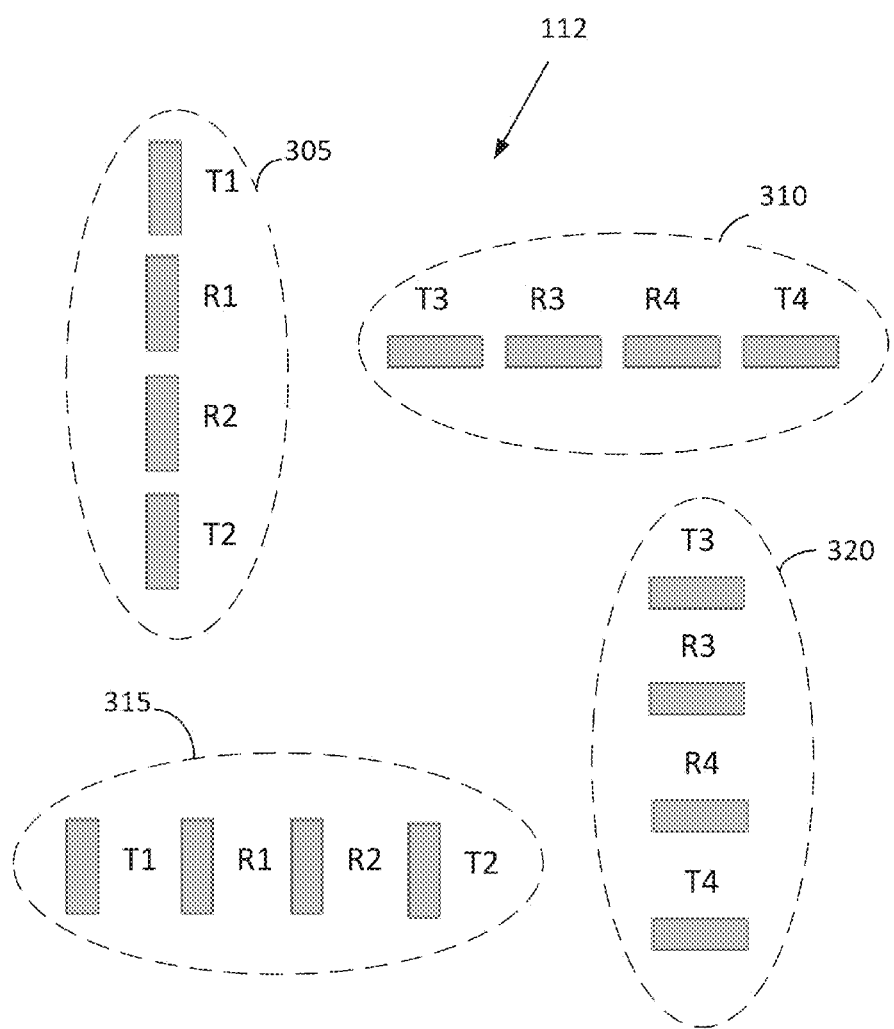
FIG. 3 illustrates exemplary antenna arrays according to the present disclosure.

FIG. 3 illustrates four exemplary electromagnetic antenna arrays 112 according to the present disclosure. In one example, each antenna array is composed of four slot antenna elements (200 and 205), using two slot antenna elements as transmitters for transmitting (T1 and T2) or (T3 and T4), and using two slot antenna elements as receivers for receiving (R1 and R2) or (R3 and R4).

Also, slot antenna transmitters T1 and T3 are interchangeable depending on which antenna array (305-320) is referred to as the first or second array. Likewise, slot antenna transmitters (T2 and T4) are also interchangeable. For similar reasons receivers (R1 and R3) and (R2 and R4) are similarly interchangeable.

Referring again to FIG. 3, each of the antenna arrays 112 has a different slot antenna element (200 and 205) configuration. In one example according to the present disclosure, a vertically polarized vertical array (VPVA) 305 may be composed of four vertically polarized slot antenna elements (200). In another example, a horizontally polarized horizontal array (HPHA) 310 is shown composed of four horizontally polarized slot antenna elements (205). In yet another example, as shown, a vertically polarized horizontal array (VPHA) 315 is shown being composed of four vertically polarized slot antenna elements (200). Also, in another example, a horizontally polarized vertical array (HPVA) 320 is shown being composed of four horizontally polarized slot antenna elements (205).

As will be described below, each of these antenna arrays (112) (e.g., 305-320) may be used in combination with another antenna array (305-320) on an opposite pad (not shown) of the downhole tool centralizer 115, or opposite side of the drill collar. Thus, considering the rotation of the tool in the wellbore 114, the two antenna arrays (305-320) can be regarded as one tool having an equivalent, vertical and horizontal, electric moments.

That is, as the tool rotates around wellbore 114, because the antenna arrays (305-320) are disposed on opposite sides of the tool (100), the antenna arrays (305-320) can simultaneously be used to detect bi-axial properties of the downhole formation such as the resistivity and permittivity of the formation in both the vertical direction and at all azimuthal angle positions within the wellbore (114).

As described above, and as will be described below, each antenna array (305-320) is disposed on opposite sides of the tool's centralizer (115), and will be used to transmit electrical signals into the wellbore (114) and receive signals associated with those transmitters, after the signals have engaged the formation downhole. One purpose for having vertical and horizontal polarities of the antenna arrays (305-320) is so that, based on the polarities of the antenna elements (200 and 205), the downhole tool may simultaneously take measurements in both the vertical and horizontal directions within the wellbore (e.g. Z and X/Y axes, respectively).

Figure 4A:
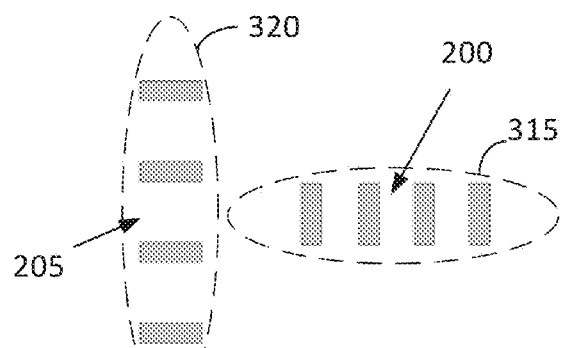
FIGS. 4A-4D illustrate exemplary combinations of antenna array configurations according to the present disclosure.

To further illustrate the possible antenna array (305-320) combinations, we now refer to FIGS. 4A-4D. As shown, four exemplary combinations of antenna array (305-320) configurations may be used according to the present disclosure. With reference to FIG. 4A, a HPVA 320 is shown in combination with a VPHA 315. Because in this example the polarity of the slot antennas elements (205) of the HPVA 320 is in the horizontal direction, the polarity of the measured data will be in the horizontal direction along the X/Y axis relative to the tool drill collar (125). Also, because the slot antenna elements (200) of the VPHA 315 of FIG. 4A are vertically polarized, the polarity of the data will be in the vertical direction, along the Z axis relative to the drill collar (125).

Figure 4B:
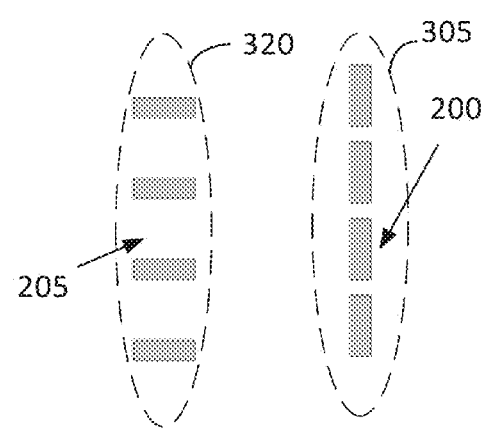
Figure 4C:
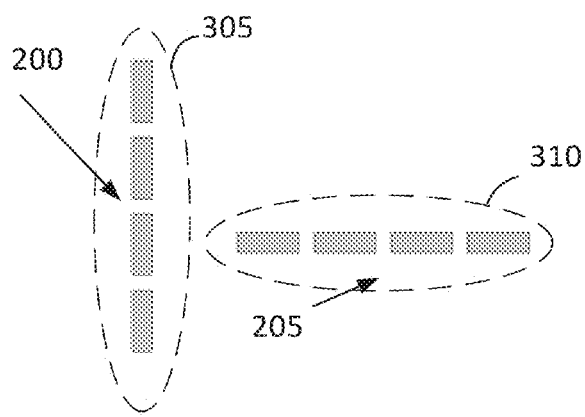
Figure 4D:
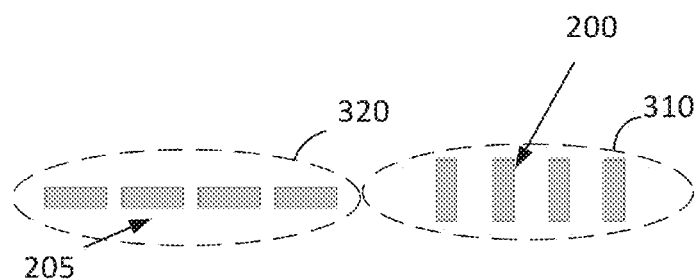

In another example referring to FIG. 4B, an HPVA 320 is shown in combination with a VPVA 305. Also, in another example referring to FIG. 4C, a VPVA 305 may be in combination with a HPHA 310, and in yet another example referring to FIG. 4C, a HPHA 320 may be in combination with a VPHA 310. In each of these examples, as described above with reference to FIG. 4A, the direction of the data measured by individual slot antennas (200 and 205) will vary with the direction of the polarization of each slot antenna (200 and 205).

Now that we have discussed slot antennas (200 and 205) and the combinations of electromagnetic array antennas (305-320) that may be disposed on the centralizers (115) of the downhole tool (100), the disclosure will now illustrate how the electromagnetic arrays (305-320) may be disposed on the one or more centralizers (115).

As shown in FIGS. 5A-5C, side and cross-sectional views of a centralizer 115 is shown according to the present disclosure. Referring to FIG. 5A, a VPHA 310 is shown disposed on a centralizer 115. As shown, the VPHA 310 is placed in the center of the centralizer's 115 pad 505, although the placement of the array on the pad 505 is not limited to the center. In one example, the centralizer 115 may have many different sizes or designs.

Also, as shown in FIG. 5B, the centralizer 115 has four pads displaced around the centralizer 115, being separated by 90°. The opposite sides of the centralizer 115 is better illustrated by referring to the cross sectional view of the centralizer 115 in FIG. 5B. As shown, the centralizer 115 has four sides separated by 90°. In one example, opposite sides of the centralizer 115 are illustrated by sides 505. In this example, an antenna array (305-320) may be on any side of the centralizer 115, with any other antenna array having opposite polarity (e.g., 305-320) being on the opposite side (i.e., separated by 180°). Also, although the tool (100) has been described above having a centralizer with four sides, the tool is not limited to four sides. The tool (100) can have many sides which would create various angles, as long as the antenna arrays (305-320) are on sides that oppose each other.

Also as shown in FIG. 5A, a wire 515 carrying electrical current is connected to the VPHA 310 in the (FRONT) pad of the centralizer 115, in the direction of the electric moment (Ev) of the vertically polarized slot antenna elements (205) (see FIG. 2A). The wire 515 is connected in a way that causes the transmitters and receivers (not shown) of the VPHA 310 to repeatedly transmit signals in the direction of the wellbore (114), and repeatedly receive signals associated with the transmitted signals after they have engaged the wellbore (114).

The transmitted and received signals are electromagnetic waves or signals that engage the wellbore (114) by inducing signals into the formation. Formation properties can then be determined by measuring or analyzing the electromagnetic waves or signals associated with the transmitted signals. The wire 515 may be one or more wires, and is also connected to the second receiver array (305-320) on the opposite (or BACK) side of the centralizer 115 (e.g., the HPVA 320 shown in FIG. 5C), forming a circuit that may be energized by an electrical source (not shown) from within the electronics section (130) or instrument section (140) of the tool (100). The source may be a battery or other source capable of driving electrical current, and may be caused to drive current by one or more processors in the electronics section (130) or instrument section (140) of the tool (100) (not shown).

The electrical current in the wire 515 traverses the VPHA 310 and the HPVA 320 in the direction of their respective electric moments (Ev or Eh) (see FIG. 2B), in a way that causes the transmitters and receivers (not shown) within the VPHA 310 and the HPVA 320 to transmit and receive signals. The diagrams in FIGS. 5A-5C are only conceptual in nature, used to illustrate example configurations and the operation of the system. The figures disclosed are not intended to limit the mechanical configurations, antenna array (305-320) configurations, or circuit designs of the present disclosure.

Now that the components of the system and various example configurations of the antenna arrays with the centralizer 115 have been illustrated, the method of obtaining quantitative measurements of resistivity and permittivity will now be described.

Figure 6:
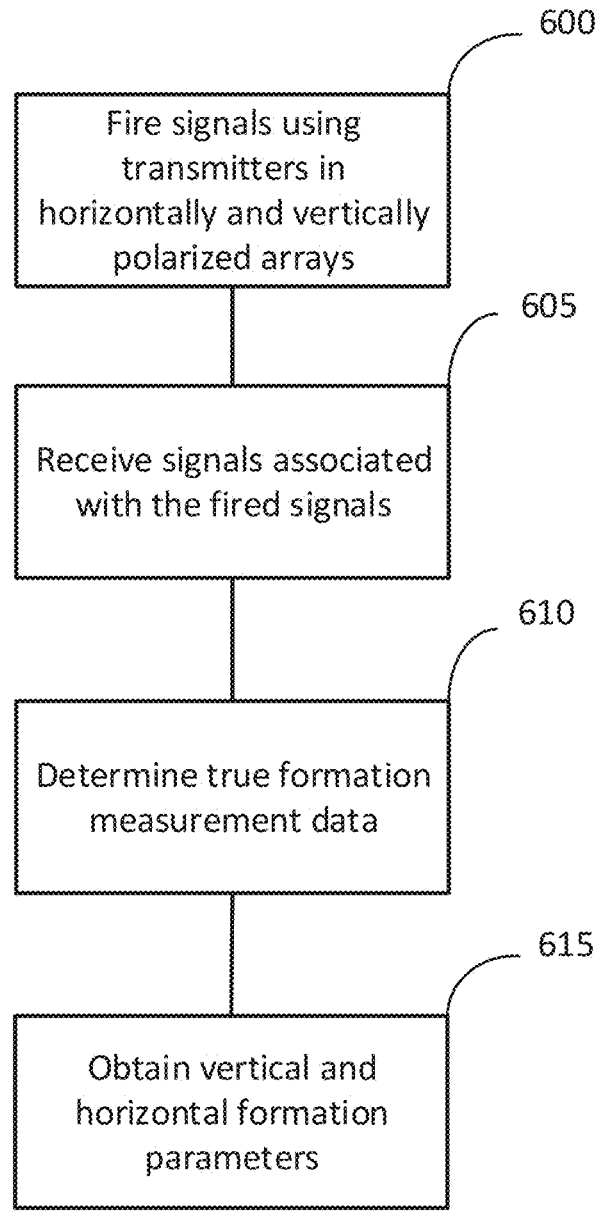
FIG. 6 illustrates a method for simultaneously obtaining quantitative vertical and horizontal formation parameters according to the present disclosure.

FIG. 6 illustrates a method for simultaneously obtaining quantitative vertical and horizontal formation parameters according to the present disclosure. Referring to step 600 and using the example transmitters and receivers of FIG. 3 for reference, one or more processors in the electronics section (130) or instrument section (140) of the tool (100) may cause the one or more wires (515) to be energized by an electrical source, thereby causing transmitters (T1 and T2) in one antenna array (i.e., one of the four antenna arrays 305-320) to transmit signals in the direction of the wellbore (114).

After the transmitted signals have engaged the wellbore (114), at step 605 the receivers (R1 and R2) will receive signals associated with the transmitted signals. Also, simultaneously with transmitters (T1 and T2) at step 600, transmitters (T3 and T4) within the second antenna array (305-320) on the opposite side of the centralizer 115 (as described in FIGS. 5A-5C) will transmit signals in the direction of the wellbore (114), and the associated signals will be received at step 605 by receivers (R3 and R4) in the second antenna array. The received signals represent apparent quantitative formation measurement data (i.e., measured apparent formation data) and may be used to determine quantitative formation properties such as the resistivity and permittivity of the formation.

As described above with reference to FIGS. 5A-5C, the two antenna arrays disposed on the opposite sides of the centralizer 115 may include any of the four combinations discussed above with reference to FIG. 3 (305-320); however, if one side of the stabilizer pad 505 has a vertically polarized array (e.g., array 305 or 315) the opposite pad will have a horizontally polarized array (e.g., array 310 or 320) disposed thereon. Accordingly, the quantitative formation properties that are determined will be reflective of the formation properties in both the vertical and horizontal directions, relative to the drill collar 125.

Also, considering the rotation of the tool (100) in the wellbore, both the horizontal and vertical arrays (305-320) on each side of the centralizer 115 can be regarded as one tool (i.e., one electromagnetic antenna) having equivalent vertical and horizontal magnetic moments, as described with reference to FIGS. 2A-2B. As a result, while the tool rotates within the wellbore (114), the tool can be used to detect the formation properties at all azimuthal angles within the wellbore (114).

Referring again to the method illustrated in FIG. 6, once the signals associated with the transmitted signals have been received at step 605, they may be processed using one or more processors (not shown) associated with the surface equipment (105), electronics section (130), or instrument section (140) to obtain the compensated voltage (Vcomp) of the quantitative formation data. The one or more processors (not shown) may communicate with memory having instructions stored thereon for enabling the one or more processors to process the signals.

Using methods known in the art, the compensated voltage Vcomp can then be used to determine the phase and attenuation. Computations that can be used for determining the Vcomp, attenuation, and phase difference along the vertical and horizontal planes of the wellbore (114) formation are shown below:

$$V_{comp} = \frac{V_{T1R2}}{V_{T1R1}} \cdot \frac{V_{T2R1}}{V_{T2R2}}, AT = 20 \cdot \log_{10}(|V_{comp}|),$$

$$PD = \text{ATAN2}(imag(V_{comp}), \text{real}(V_{comp}))$$

$$V_{comp} = \frac{V_{T3R4}}{V_{T3R3}} \cdot \frac{V_{T4R3}}{V_{T4R4}}, AT = 20 \cdot \log_{10}(|V_{comp}|),$$

$$PD = \text{ATAN2}(imag(V_{comp}), \text{real}(V_{comp}))$$

As shown, the voltage compensation (Vcomp) for transmitters (T1-T4) and receivers (R1-R4) of the two antenna arrays (305-320) can be used to determine the attenuation ("AT" of the above equation) and the phase difference ("PD" of the above equation) of the wellbore (114) formation.

Because the apparent formation measurement data is only the apparent, and not the real data, it is necessary to invert the apparent formation measurement data for each array (i.e., each of the vertical and horizontal arrays on opposite sides of the tool, see FIG. 5A-5C). Using inversion, the true formation measurement data (i.e., true vertical and horizontal, phase difference and attenuation) may be obtained.

Referring to step 610 of FIG. 6, in one example 0D or "zero dimension" inversion as known in the art can be used to obtain the true vertical and horizontal formation measurement data.

As discussed above, once the true phase difference and attenuation (i.e., true formation data) has been determined using the above equation, at step 615 using techniques known in the art, the true formation data can be used to obtain the formation parameters such as the resistivity and permittivity of the formation. Such known methods for determining these parameters include, using lookup tables or using real time processing based on the tool response.

Figure 7:
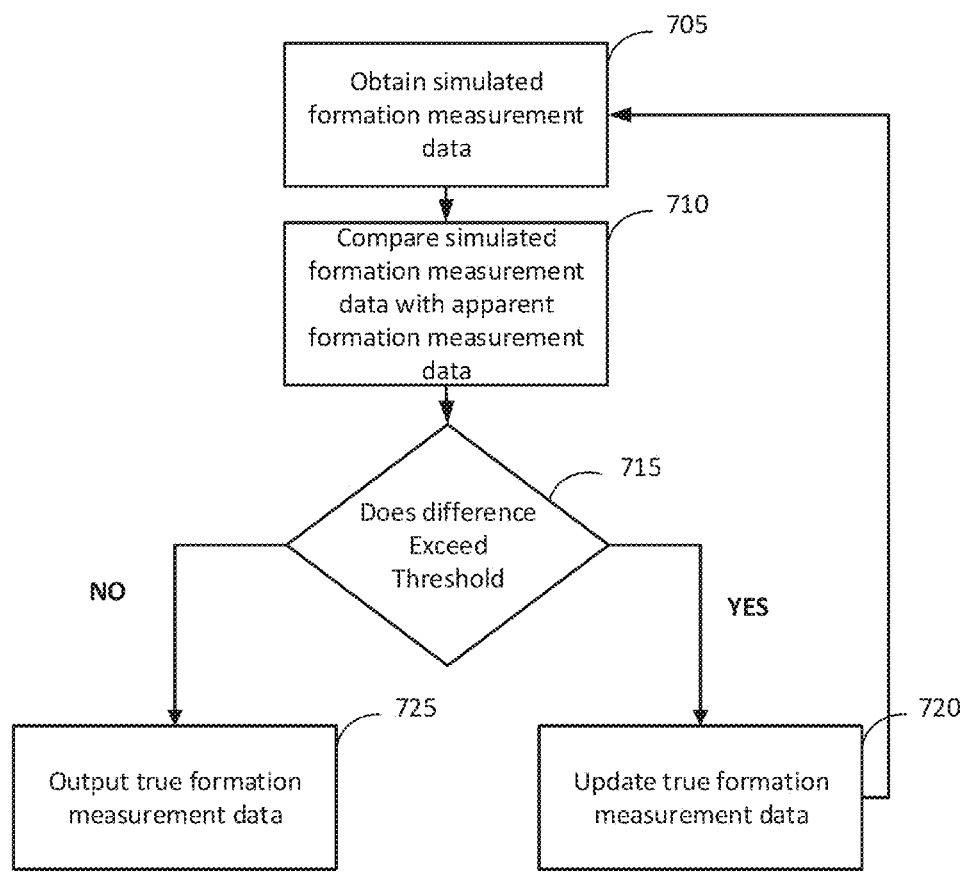
FIG. 7 illustrates a method for determining true formation measurement data according to the present disclosure.

Referring now to FIG. 7, a method of inverting the apparent vertical and apparent horizontal formation measurement data values using 0D inversion is illustrated according to the present disclosure. The inversion process described below may be performed by one or more processors (not shown) associated with surface equipment (105) having an up hole processing unit, electronics section (130), or instrument section (140). The inversion method begins at step 705 by using the one or more processors to obtain simulated formation measurement data (i.e., the simulated attenuation and phase difference responses of the tool). The simulated formation measurement data is the modeled response data of the tool (100) with respect to known parameters of the formation to which the tool is being applied. Thus, the simulated formation measurement data can be obtained by simulating or numerically modeling the interaction between the tool and the formation within the wellbore 114.

After the simulated formation measurement data has been obtained, at step 710 the simulated formation measurement data is compared with the apparent formation measurement data determined above. If at step 715 the difference between the simulated formation measurement data and the apparent formation measurements exceed a predefined threshold, the method at step 720 will determine and incrementally update a value representing the true formation measurement data by calculating a Jacobian matrix as is known in the art.

Once the true formation measurement data has been determined at step 720, and the difference between the simulated formation measurement values and the true formation measurement data does not exceed the predefined threshold (after repeating steps 705 through 715 using the true formation measurement data), the true formation measurement data is output by the system as the true formation measurement data.

However, if after the initial comparison step at 715, the difference between the simulated formation measurement data and the apparent formation measurement data does not exceed a predefined threshold, the apparent formation measurement data is output as the true formation measurement data at step 725.

As a result, the tool can be used to simultaneously obtain quantitative measurements of the resistivity and permittivity of a formation in both the vertical and horizontal directions within a wellbore. Also, by rotating the drill string (113) while taking the measurements, and transmitting using higher frequencies, the vertical and horizontal resistivity and permittivity of the formation may be determined at all azimuthal angles around wellbore (114), in either oil or water based mud.

The foregoing description of preferred and other embodiments is not intended to limit or restrict the scope or applicability of the inventive concepts conceived of by the Applicant. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A downhole tool, comprising:
   a drill collar; and
   a horizontally polarized transmitter-receiver array and a vertically polarized transmitter-receiver array disposed on opposite sides of the drill collar, each array further comprising at least a first and a second transmitter and at least a first and a second receiver,
   wherein:
   the first receiver of each array is disposed between the first transmitter and the second receiver of said array; and
   the second receiver of each array is disposed between the first receiver and the second transmitter of said array.

2. The downhole tool of claim 1, wherein the transmitter-receiver arrays are operatively interconnected and configured to:
   simultaneously fire the first transmitter in each of the arrays to cause first electromagnetic signals to engage a downhole formation;
   receive with the first and second receivers in each of the arrays second electromagnetic signals associated with the first electromagnetic signals after the first electromagnetic signals have engaged the downhole formation, the second electromagnetic signals being representative of apparent formation data;

simultaneously firing the second transmitter in each of the arrays to cause third electromagnetic signals to engage the downhole formation; and receive with the first and second receivers in each of the arrays fourth electromagnetic signals associated with the third electromagnetic signals after the third electromagnetic signals have engaged the downhole formation, the fourth electromagnetic signals being representative of apparent formation data.

3. The downhole tool of claim 2, wherein the tool is adapted to be coupled to a programmable processing device configured to:

derive true formation measurement data from the apparent formation measurement data; and derive one or more vertical and horizontal formation parameters using the true formation measurement data.

4. The downhole tool of claim 3, wherein the programmable processing device is disposed within surface equipment.

5. The downhole tool of claim 3, wherein the programmable processing device is disposed within the downhole tool.

6. The downhole tool of claim 3, wherein the vertical and horizontal formation parameters include the vertical and horizontal resistivity and permittivity of the downhole formation.

7. The downhole tool of claim 3, wherein the apparent formation measurement data includes the phase and attenuation of the apparent formation measurement data.

8. The downhole tool of claim 3, wherein the true formation measurement data is derived by simulating or numerically modelling an interaction between the downhole tool and the formation and comparing simulated or modelled data to the apparent formation data.

9. The downhole tool of claim 1, wherein the first and second transmitters in each of the arrays fires high frequency signals.

10. The downhole tool of claim 9, wherein the high frequency signals comprise signals having a frequency between 10 MHz and 20 GHz.

11. The downhole tool of claim 1, wherein the horizontally and vertically polarized transmitter-receiver arrays are disposed on opposite sides of a centralizer disposed on the drill collar.

12. A programmable processing device adapted to be connected to a downhole tool, the downhole tool comprising a drill collar, wherein a horizontally polarized transmitter-receiver array and a vertically polarized transmitter-receiver array are disposed on opposite sides of the drill collar, each array further comprising at least a first and a second transmitter and at least a first and a second receiver, wherein the first receiver of each array is disposed between the first transmitter and the second receiver of said array and the second receiver of each array is disposed between the first receiver and the second transmitter of said array, the programmable processing device being further coupled to a memory having instructions stored thereon causing the programmable processing device to:

receive from the downhole tool:

apparent formation data derived from first electromagnetic signals received by the first and second receivers of each array as a result of electromagnetic signals transmitted from the first transmitter and engaging the formation; and apparent formation data derived from second electromagnetic signals received by the first and second receivers of each array as a result of electromagnetic signals transmitted from the second transmitter and engaging the formation;

derive true formation data from the apparent formation data; and derive one or more vertical and horizontal formation parameters using the true formation measurement data.

13. The device of claim 12, wherein the programmable processing device is disposed within surface equipment.

14. The device of claim 12, wherein the programmable processing device is disposed within the downhole tool.

15. The device of claim 12, wherein the vertical and horizontal formation parameters include the vertical and horizontal resistivity and permittivity of the downhole formation.

16. The device of claim 12, wherein the apparent formation measurement data includes the phase and attenuation of the apparent formation measurement data.

17. The device of claim 12, wherein the true formation measurement data is derived by simulating or numerically modelling an interaction between the downhole tool and the formation and comparing simulated or modelled data to the apparent formation data.

18. A non-transitory computer-readable storage medium having stored thereon instructions to cause a programmable processing device to:

receive from a downhole tool coupled to the programmable processing device:

apparent formation data derived from first electromagnetic signals received by adjacent first and second receivers of at least one horizontally-polarized transmitter-receiver array and at least one vertically-polarized transmitter receiver array as a result of electromagnetic signals transmitted from a first transmitter engaging the formation, the first transmitter being located on a first side of the first and second receivers of each transmitter-receiver array; and apparent formation data derived from second electromagnetic signals received by the adjacent first and second receivers of each array as a result of electromagnetic signals transmitted from a second transmitter engaging the formation, the second transmitter being located on an opposite side of the first and second receivers of each transmitter-receiver array from the first side;

derive true formation data from the apparent formation data; and derive one or more vertical and horizontal formation parameters using the true formation measurement data.

19. The medium of claim 18, wherein the vertical and horizontal formation parameters include the vertical and horizontal resistivity and permittivity of the downhole formation.

20. The medium of claim 18, wherein the apparent formation measurement data includes the phase and attenuation of the apparent formation measurement data.

21. The medium of claim 18, wherein the true formation measurement data is derived by simulating or numerically modelling an interaction between the downhole tool and the formation and comparing simulated or modelled data to the apparent formation data.

* * * * *